United States Patent
Ohara (10) Patent No.: US 7,136,179 B2
(45) Date of Patent: Nov. 14, 2006

(54) PRINTING SYSTEM AND PRINTING CONTROL METHOD THEREFOR

(75) Inventor: Hiromi Ohara, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 854 days.

(21) Appl. No.: 09/873,235

(22) Filed: Jun. 5, 2001

(65) Prior Publication Data
US 2002/0051204 A1 May 2, 2002

(30) Foreign Application Priority Data
Jun. 5, 2000 (JP) ............................. 2000-168154

(51) Int. Cl.
G06F 15/00 (2006.01)
H04N 1/00 (2006.01)
H04N 1/46 (2006.01)

(52) U.S. Cl. .................... 358/1.15; 358/1.16; 358/402; 358/403; 358/407; 358/408; 358/505

(58) Field of Classification Search ............... 358/1.15, 358/1.16, 402, 403, 407, 408, 505
See application file for complete search history.

(56) References Cited

U.S. PATENT DOCUMENTS

| | | | |
|---|---|---|---|
| 4,658,299 A | | 4/1987 | Tanaka et al. |
| 4,791,492 A | | 12/1988 | Nagashima et al. |
| 5,580,177 A | * | 12/1996 | Gase et al. ............... 400/61 |
| 5,930,465 A | * | 7/1999 | Bellucco et al. ........... 358/1.15 |
| 5,978,557 A | * | 11/1999 | Kato ........................ 358/1.15 |
| 6,115,739 A | * | 9/2000 | Ogawa et al. ............. 709/215 |
| 6,348,971 B1 | * | 2/2002 | Owa et al. ................ 358/1.15 |
| 6,631,008 B1 | * | 10/2003 | Aoki ........................ 358/1.15 |

FOREIGN PATENT DOCUMENTS

| | | |
|---|---|---|
| JP | A-59-189768 | 10/1984 |
| JP | A-2-79662 | 3/1990 |
| JP | A 5-298225 | 11/1993 |
| JP | B2 2537160 | 7/1996 |
| JP | A-9-275464 | 10/1997 |

* cited by examiner

Primary Examiner—Douglas Q. Tran
Assistant Examiner—Chan S. Park
(74) Attorney, Agent, or Firm—Oliff & Berridge, PLC (57) ABSTRACT

Efficient and optimum printing is enabled using multiple, different models of printers. When a scanner receives a multiple simultaneous output instruction from the operator, the instruction of multiple simultaneous output, printing instruction information specified by the operator (such as the number of prints, duplex printing and stapling) and multiple pieces of image data produced according to multiple models of printers are transmitted to a printing management server. When the printing management server receives the multiple simultaneous output instruction, the printing instruction information and the multiple pieces of image data, the server stores and manages the printing instruction information and the multiple pieces of image data in association with each other. Image data corresponding to a desired printer is transmitted based on the stored and managed data.

12 Claims, 7 Drawing Sheets

FIG. 4A  SCREEN FOR SELECTING PRINTING METHOD

FIG. 4B  DISPLAYED LIST OF SELECTABLE PRINTERS

FIG. 4C  SETTING SCREEN FOR EACH SELECTED PRINTER AT THE TIME OF OUTPUT

SELECTED PRINTER ICON DISPLAY PORTION

PRINTING INSTRUCTION SETTING PORTION

PRINTING SYSTEM AND PRINTING CONTROL METHOD THEREFOR

BACKGROUND OF THE INVENTION

1. Field of the Invention

The present invention relates generally to a printing system including multiple, different models of printers and a printing control method therefor, and more specifically, to a printing system which allows efficient and optimum printing using multiple, different models of printers and a printing control method therefor.

2. Description of the Background Art

In general, a printer is characterized as a machine for color or monochrome or the like depending upon the model.

Therefore, in a printing system with multiple, different models of printers, for example, image data suited to the characteristics of a data output destination printer is produced based on original data read by an image input device (such as a scanner), and the image data is output to the printer in order to obtain a fine printing image quality.

However, if the image data produced for a machine of a model is used for printing by a printer of another model, a good printing image quality does not result.

Meanwhile, image data, which can be printed with all models of printers, takes much time to print using some machine or the resulting printing image quality is not necessarily good.

More specifically, Japanese Patent Publication No. 2537160 entitled "processing device" (hereinafter referred to as the "conventional technique A") for example discloses such a printing system with multiple, different models of printers.

According to the conventional technique A, the operator specifies a combination of an image input device (such as a scanner) and an image output device (such as a printer). Then in a processing device, an image processing corresponding to the characteristics of the specified image output device is performed to image information input from the image input device (such as a scanner), and then image data is output to the corresponding image output device.

According to the conventional technique A, image data corresponding to the characteristics of an output destination printer is produced and output to the printer, so that a fine printing image quality results. However, the image input device (such as a scanner) and the image output device (such as a printer) have to be connected on a one-to-one basis, and printing cannot efficiently be performed.

As another example, Japanese Patent Laid-Open No. 5-298225 entitled "Data Processing Method and Device Using the Method" discloses another technique (hereinafter referred to as "conventional technique B").

According to the conventional technique B, an output device (printer) is selected based on the type, size and attribute of input image data and the input image data is output to the selected output device (printer).

According to the conventional technique B, however, the image data is not produced corresponding to the characteristics of an output destination device (printer), and a fine printing image quality hardly results.

As described above, in a printing system including multiple, different models of printers according to the technique A, for example, image data corresponding to the characteristics of the output destination printer is produced and output to the printer, and a fine printing image quality results. However, an image input device (scanner) and an image output device (printer) have to be connected on a one-to-one basis, and therefore a printing request cannot simultaneously be issued to multiple printers from one image input device. As a result, printing cannot efficiently be performed.

According to the conventional technique B, an output device (printer) is selected based on the type, size and attribute of input image data and the input image data is output to the selected output device (printer). According to the conventional technique, however, the image data is not produced corresponding to the characteristics of an output destination device (printer), and a fine printing image quality hardly results.

SUMMARY OF THE INVENTION

The present invention provides a printing system capable of performing efficient and optimum printing using multiple, different models of printers.

A printing system according to an aspect of the present invention includes an image input device, multiple printers, and a printing management device receiving printing instruction information and transmitting printing information corresponding to the printing instruction information to a corresponding printer among the multiple printers. The image input device includes a printing instruction information setting section for setting printing instruction information including specification of a desired printer among the multiple printers, an image data producing section for producing image data corresponding to the printing instruction information set by the printing instruction information setting section, and a transmitting section for transmitting the printing instruction information set by the printing instruction information setting section and the image data produced by the image data producing section to the printing management device. The printing management device includes a storage management section for storing and managing the printing instruction information and the image data transmitted from the transmitting section in association with each other; and a transmission control section for transmitting the image data corresponding to the desired printer based on the printing instruction information stored and managed in the storage management section.

A printing system according to another aspect of the present invention also includes an image input device, multiple printers, and a printing management device receiving printing instruction information and transmitting printing information corresponding to the printing instruction information to a corresponding printer among the multiple printers. The image input device includes a printing instruction information setting section for setting printing instruction information including specification of a desired printer among the multiple printers, an image data producing section for producing image data corresponding to the printing instruction information set by the printing instruction information setting section, and a transmitting section for transmitting the printing instruction information set by the printing instruction information setting section and information on a storing location of the image data produced by the image data producing section to the printing management device. The printing management device includes a storage management section for storing and managing the printing instruction information and the information on the storing location of the image data transmitted from the transmission section in association with each other, and a transmission control section for transmitting the image data corresponding to the desired printer based on the printing instruction information stored and managed by the storage management section to the desired printer from the storing location of the image data indicated in the information on the storing location.

A printing control method according to yet another aspect of the present invention is provided for the printing system including an image input device, multiple printers, and a printing management device receiving printing instruction information and transmitting printing information corresponding to the printing instruction information to a corresponding printer among the multiple printers. The method includes the steps of causing the image input device to set printing instruction information including specification of a desired printer among the multiple printers, produce image data corresponding to the set printing instruction information, and transmit the set printing instruction information and the produced image data to the printing management device, and causing the printing management device to store and manage the printing instruction information and the image data transmitted from the image input device in association with each other, and transmit the image data corresponding to the desired printer based on the stored and managed printing instruction information.

A printing control method according to a further aspect of the present invention is also provided for the printing system including an image input device, multiple printers, and a printing management device receiving printing instruction information and transmitting printing information corresponding to the printing instruction information to a corresponding printer among the multiple printers. The method includes the steps of causing the image input device to set printing instruction information including specification of a desired printer among the multiple printers, produce image data corresponding to the set printing instruction information, and transmit the set printing instruction information and information on a storing location of the produced image data, and causing the printing management device to store and manage the printing instruction information and information on the storing location of the image data transmitted from the image input device in association with each other, and transmit the image data corresponding to the desired printer based on the stored and managed printing instruction information to the desired printer from the storing location of the image data indicated in the information on the storing location.

BRIEF DESCRIPTION OF THE DRAWINGS

A preferred embodiment of the present invention will be now described in detail based on the following figures, wherein.

DESCRIPTION OF THE PREFERRED EMBODIMENT

A printing system according to an embodiment of the present invention will be now described in detail in conjunction with the accompanying drawings.

Figure 1:
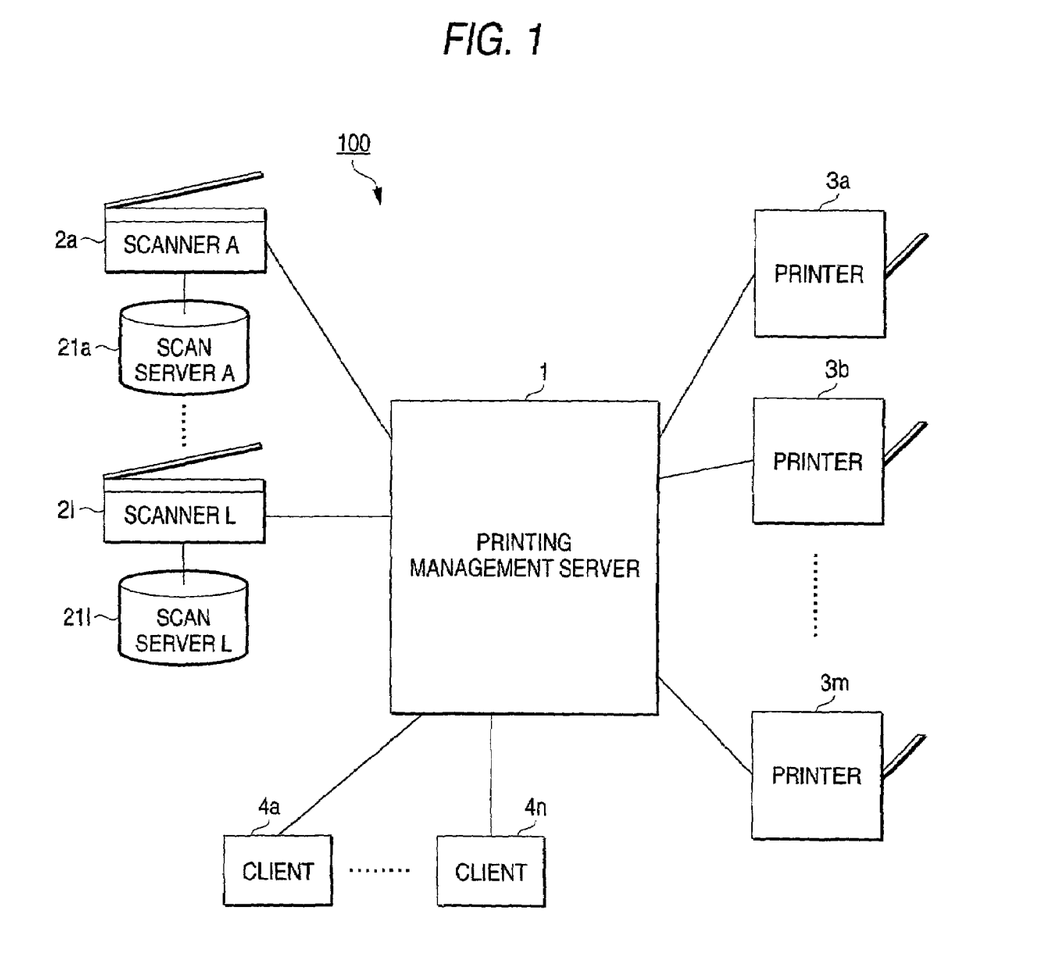
FIG. 1 is a block diagram of the configuration of a printing system according to the present invention.

FIG. 1 is a block diagram of the configuration of a printing system according to the present invention.

As shown in FIG. 1, the printing system includes a printing management server 1, scanners 2 (2a to 2l), printers 3 (3a to 3m), and clients 4 (4a to 4n).

Here, the printing management server 1 manages multiple pieces of image data produced for multiple, different models of printers used for printing, and printing instructions (the number of prints, the type of paper sheets, duplex printing, stapling, etc.) specified by the operator linked (bundled) with each other.

The scanner 2 (2a to 2l) reads an original and outputs image data. An associated scan server 21 (21a to 21l) stores the image data.

The printer 3 (3a to 3m) forms an image on a paper sheet based on printing data such as image data.

The client 4 (4a to 4n) uses application software and accesses the printing management server 1 and the like.

The printing management server 1 will be now described in detail.

Figure 2:
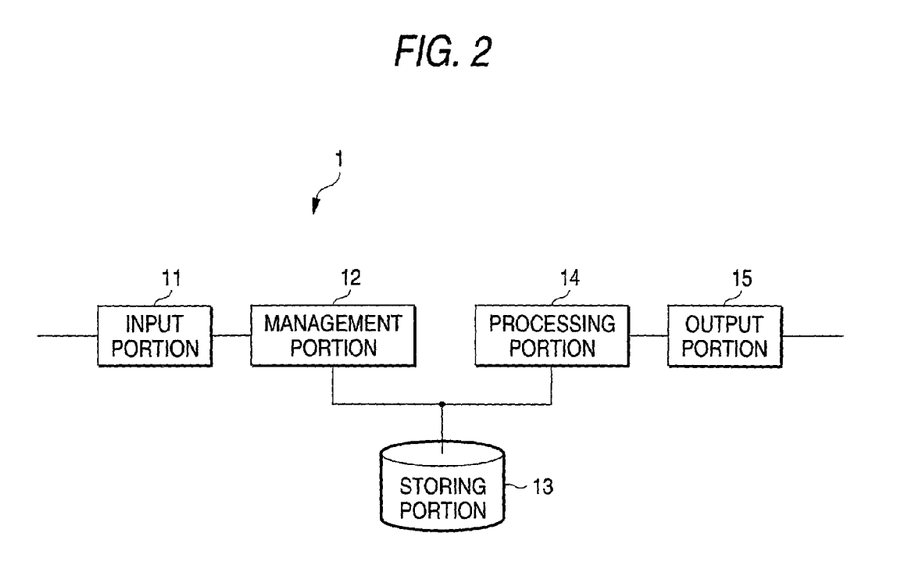
FIG. 2 is a schematic block diagram of the configuration of the printing server shown in FIG. 1.

FIG. 2 is a block diagram of the schematic configuration of the printing management server 1 shown in FIG. 1.

As shown in FIG. 2, the printing management server 1 includes an input portion 11, a management portion 12, a storing portion 13, a processing portion 14, and an output portion 15.

Here, the input portion 11 receives image data or a printing request from the scanner 2 or the client 4.

The management portion 12 manages multiple pieces of image data and printing instruction information to be stored to the storing portion 13 as they are linked with each other.

The storing portion 13 stores the multiple pieces of image data and the printing instruction information linked with each other under the control of the management portion 12. The printing instruction information includes which printer is selected for printing, when the printing is carried out, size of paper sheets, single-sided or double-sided printing, to be stapled or not, or the like.

In accordance with the printing request, the processing portion 14 selects an optimal printer to output the piece of image data, prepares printing data for each printer, converts the format of the piece of image data into that suited to the output destination printer, or converts the piece of image data into the printing data, as required.

The output portion 15 outputs printing data or the like.

The printing management server 1 manages and stores multiple pieces of image data and printing instruction information linked (bundled into one) with each other in the storing portion 13, and based on the printing instruction information, selects an optimal printer for outputting each piece of image data among the different models of printers. Therefore, efficient printing with a fine printing image quality is enabled for each of different models of printers.

How the multiple pieces of image data and the printing instruction information are stored and managed linked with each other in the storing portion 13 will be now described.

Figure 3A:
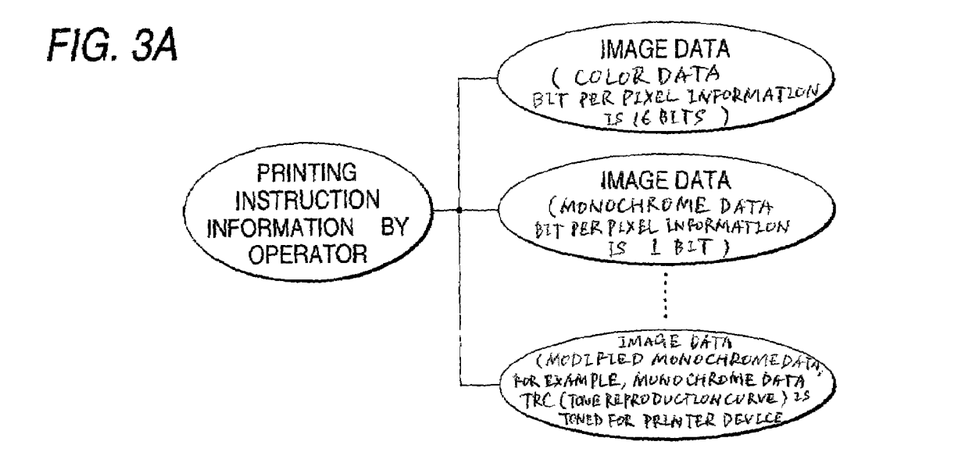
FIGS. 3A and 3B are diagrams showing how multiple pieces of image data and printing instruction information are stored in association wit each other in the storing portion in FIG. 2.
Figure 3B:
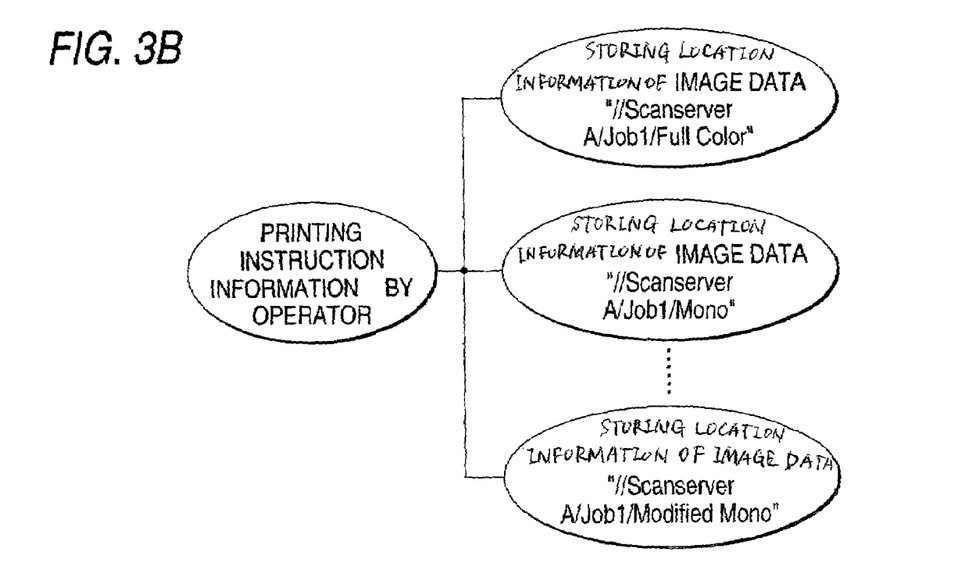

FIGS. 3A and 3B are diagrams showing how multiple pieces of image data and printing instruction information are stored and managed linked with each other in the storing portion 13 shown in FIG. 2.

As shown in FIG. 3A, the storing portion 13 stores printing instruction information specified by the operator linked (bundled into one) with image data produced for each of different models of printers. Note that in this example, the printing instruction information by the operator is stored linked (bundled into one) with "image data for multi-value (bit per pixel information is 16 bits), color image," "image data for binary (bit per pixel information is 1 bit), monochrome image," and "image data for binary (bit per pixel information is 1 bit), modified monochrome image (for example, Tone Reproduction Curve is toned for printer devices)" as image data.

As shown in FIG. 3B, the storing portion 13 may store printing instruction information specified by the operator linked with information indicating locations where image data produced corresponding to different models of printers is stored.

Note that in this example, the printing instruction information by the operator is stored linked with "storing location information of image data for multi-value, color image: "//Scanserver A/Job1/Full Color," "storing location information of image data for binary, monochrome image data: "//Scanserver A/Job1/Mono," and "image data for binary, modified monochrome image data: //Scanserver A/Job1/Modified Mono." Using the storing location information, the scan server, the job and the type of image data can be specified.

Figure 4A:
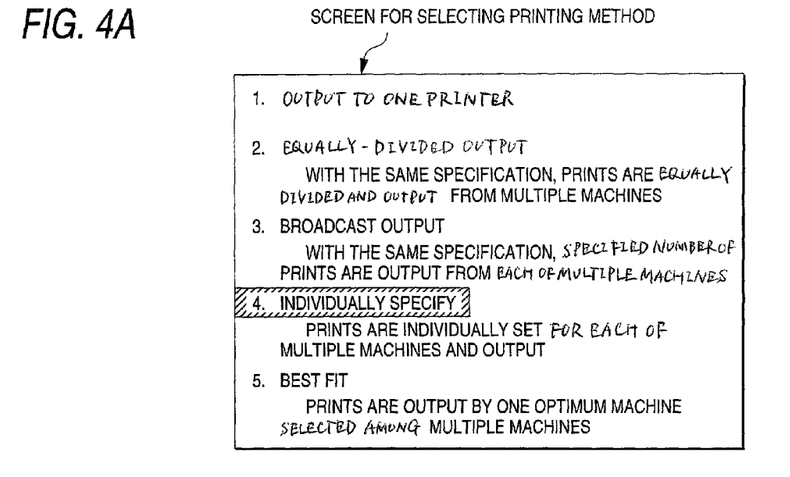
FIGS. 4A to 4C are diagrams each showing an example of a setting screen displayed on a display portion such as a touch panel (not shown) in the scanner shown in FIG. 1.
Figure 4B:
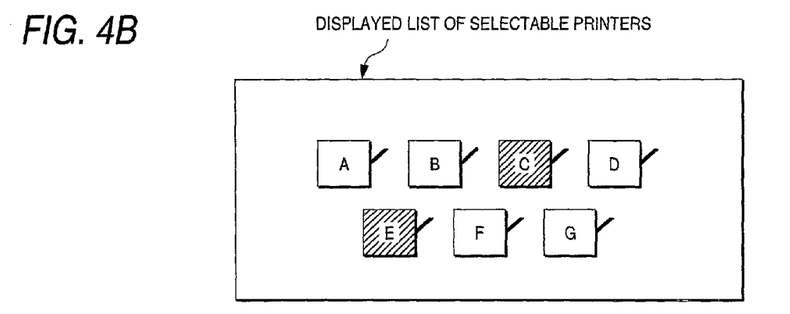
Figure 4C:
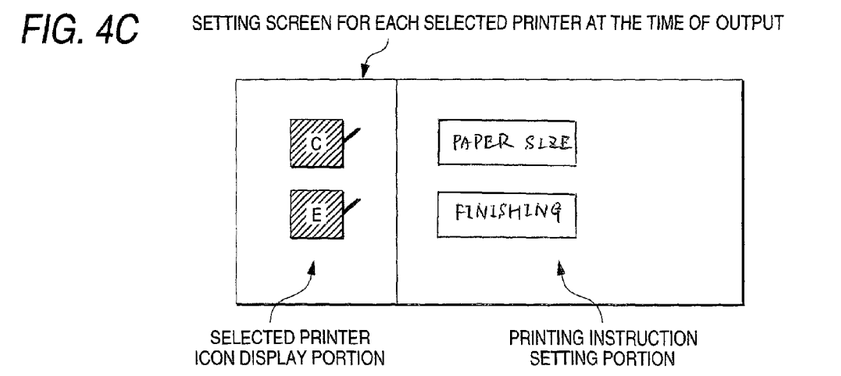

FIGS. 4A to 4C show an example of a setting screen on a display portion such as a touch panel (not shown) in the scanner 2 in FIG. 1. The screen corresponds to the case when the operator selects "multiple simultaneous output."

FIG. 4A shows a screen for selecting a printing method, FIG. 4B shows a display screen including a list of selectable printers, and FIG. 4C shows a setting screen for each selected printer at the time of output.

As shown in FIG. 4A, the screen for selecting the printing method displays "1. Output to one printer," "2. Equally-division output," "3. Broadcast output," "4. Individually specify," and "5. Best fit."

Herein, "1. Output to one printer" indicates that printing is not divided for output by multiple printers. In other words, printing is performed using one printer. "2. Equally-division output" means, for example, that if it is specified that the number of prints is 100 and the printing is performed by four printers, and then "Equally-divided output" is selected, the printing management server 1 equally divides the number of prints for each printer. Accordingly, the number of prints assigned to each of four printers is 25. "3. Broadcast output" means, for example, that if it is specified that the number of prints is 100 and the printing is performed by four printers, and then "Broadcast output" is selected, the printing management server 1 assigns the specified number of prints to each printer. Accordingly, the number of prints assigned to each of four printers is 100. "4. Individually specify" means that the user can arbitrarily set the number of prints for individual printer. For example, the number of prints assigned to printer A can be 10, printer B can be 20, printer C can be 15. "5. Best fit" indicates that printing is performed using one optimum machine among selected multiple machines for output. In this example, "4. Individually specify" is selected (the shadowed portion in FIG. 4A).

The setting screen in FIG. 4B is displayed, when the operator instructs to print with multiple printers, in other words, when setting items 2 to 5 are selected in the setting screen in FIG. 4A. In this example, printer icons A to G are indicated as selectable printers. Note that in this case, the printer icons C and E are selected (the shadowed portions).

The setting screen in FIG. 4C is displayed when the operator instructs to select multiple printer icons (C and E) in the setting screen in FIG. 4B.

When the operator selects a printer icon displayed on the left part in the setting screen, a part to set an output instruction at the printer (such as the number of prints, the type of paper sheets, duplex printing, stapling, and punching) is displayed on the right part of the screen. Note that if an output instruction is set for other printers, their printer icons can similarly be selected for the purpose.

The operation of the above structure according to the present invention will be now described.

Figure 5:
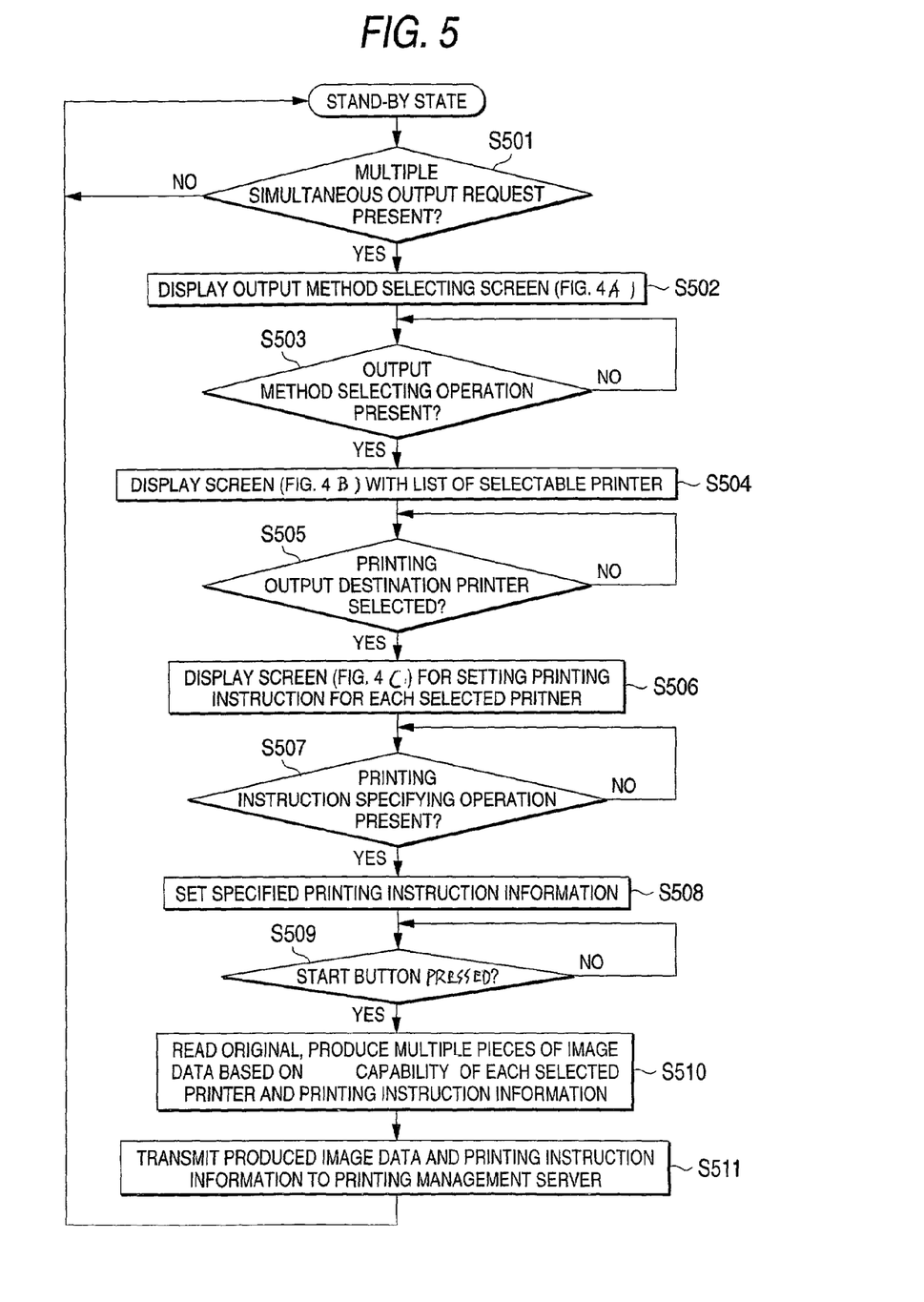
FIG. 5 is a flowchart for use in illustration of the process of processing operation on the side of a scanner when the operator uses different models of printers for simultaneous printing.

FIG. 5 is a flowchart for use in illustration of the process of processing operation on the side of the scanner 2, when the operator uses different models of printers for printing at the same time. In this case, the operator specifies a color printer and a high speed monochrome printer as output destination printers. According to the instruction, the color printer is to print one OHP sheet, while the high speed monochrome printer is to print fifty plain paper sheets, and duplex printing and stapling are specified.

In FIG. 5, the processing is started when the scanner 2 is in a stand-by state and the operator requests multiple simultaneous output through the operation display portion such as a touch panel which is not shown (YES in step S501).

Then in the scanner 2, the screen for selecting the outputting method (FIG. 4A) is displayed on the display portion (step S502).

Thereafter, in the scanner 2, it is determined whether or not the operation of selecting the outputting method is performed by the operator (such as the operation of selecting "4. individually specify." (step S503).

As a result, if it is determined that the operator has performed the operation of selecting the outputting method (such as the operation of selecting "4. individually specify") (YES in step S503), then in the scanner 2, a display screen including a list of selectable printers (FIG. 4B) is displayed. (step S504).

Thereafter, in the scanner 2, it is determined whether or not multiple printing output destination printers (for example, "printer icon C: color printer" and "printer icon E: high speed monochrome printer") are selected (step S505).

As a result, if it is determined that multiple printing output destination printers are selected (YES in step S505), a printing instruction setting screen for each of the selected printers (FIG. 4C) is displayed in the scanner 2 (step S506).

Thereafter, in the scanner 2, it is determined whether the operator has performed a printing instruction specifying operation (for example whether each printer icon displayed in FIG. 4C has been selected to specify a printing instruction for each printer) (step S507).

As a result, if it is determined that the operator has performed a printing instruction specifying operation (YES in step S507), in the scanner 2, the specified printing instruction information (for example printing one OHP sheet using the printer icon C: color printer, and fifty plain paper sheets using the printer icon E: high speed monochrome printer, duplex printing and stapling) is set (step S508).

Then, in scanner 2, it is determined whether all the setting for output has been completed by the operator and the start button has been pressed (step S509).

As a result, if it is determined that the start button has been pressed by the operator (YES in step S509), in the scanner 2, an original is read and multiple pieces of image data (such as 600 dpi, monochrome binary image data and 400 dpi, color multi-value image data) are produced based on the information on the capability of each selected printer and the printing instruction information (step S510). Note that in this example, in the scanner 2, information on the model of the printer specified as a printing destination by the operator is obtained from the printing management server 1, and image data is produced.

Thereafter, in the scanner 2, the produced image data and the printing instruction information specified by the operator are transmitted to the printing management server 1 (step S511). Note that thereafter the scanner 2 transits to a stand-by state.

Figure 6:
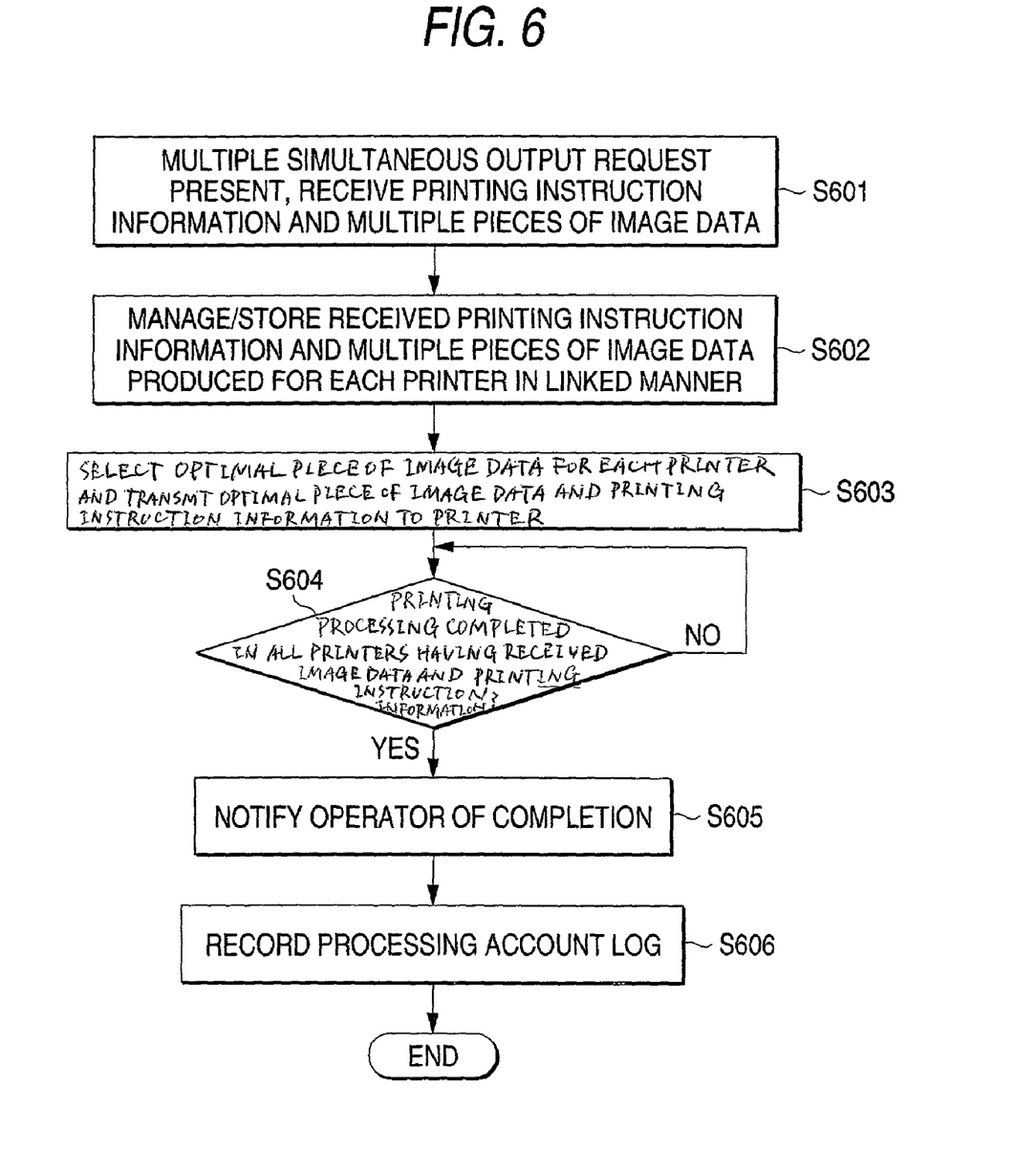
FIGS. 6 and 7 are flowcharts for use in illustration of the process of processing operation on the side of the printing management server when the operator uses different models of printers for simultaneous printing.

FIG. 6 is a flowchart for use in illustration of the process of processing operation on the side of the printing management server 1 when multiple, different models of printers perform printing at the same time. In this example, printing is performed at the same time using all models of printers selected and specified by the operator.

As shown in FIG. 6, the processing is started when the printing management server 1 receives a request of multiple simultaneous output from the scanner 2, printing instruction information and multiple pieces of image data produced for each model of printers (step S601).

The printing management server 1 stores and manages the transmitted printing instruction information and the multiple pieces of image data produced for each printer linked with each other (step S602).

Then, the printing management server 1 transmits image data corresponding to each printer based on the printing instruction information specified by the operator (step S603).

Then in the printing management server 1, it is determined whether or not printing processing in all the printers has been completed (step S604), and as result, if the printing processing in all the printers has been completed (YES in step S604), the operator is notified of the completion (step S605).

Then, the printing management server 1 records the processing account log (information about which printer has printed how many sheets) (step S606), and the processing ends.

In this structure, multiple, different models of printers can perform printing operation by one scanning operation, so that efficient printing is enabled.

Also in this structure, when multiple, different models of printers are used for printing, image data corresponding to the characteristics of the model of each printer is produced, so that a fine printing image quality can be provided.

Note that in the embodiment described above, an instruction of printing using multiple, different models of printers at the same time is issued to the printing management server 1 from the scanner 2. The present invention is however not limited to this, and the same processing is performed if an instruction is issued from the client 4.

Figure 7:
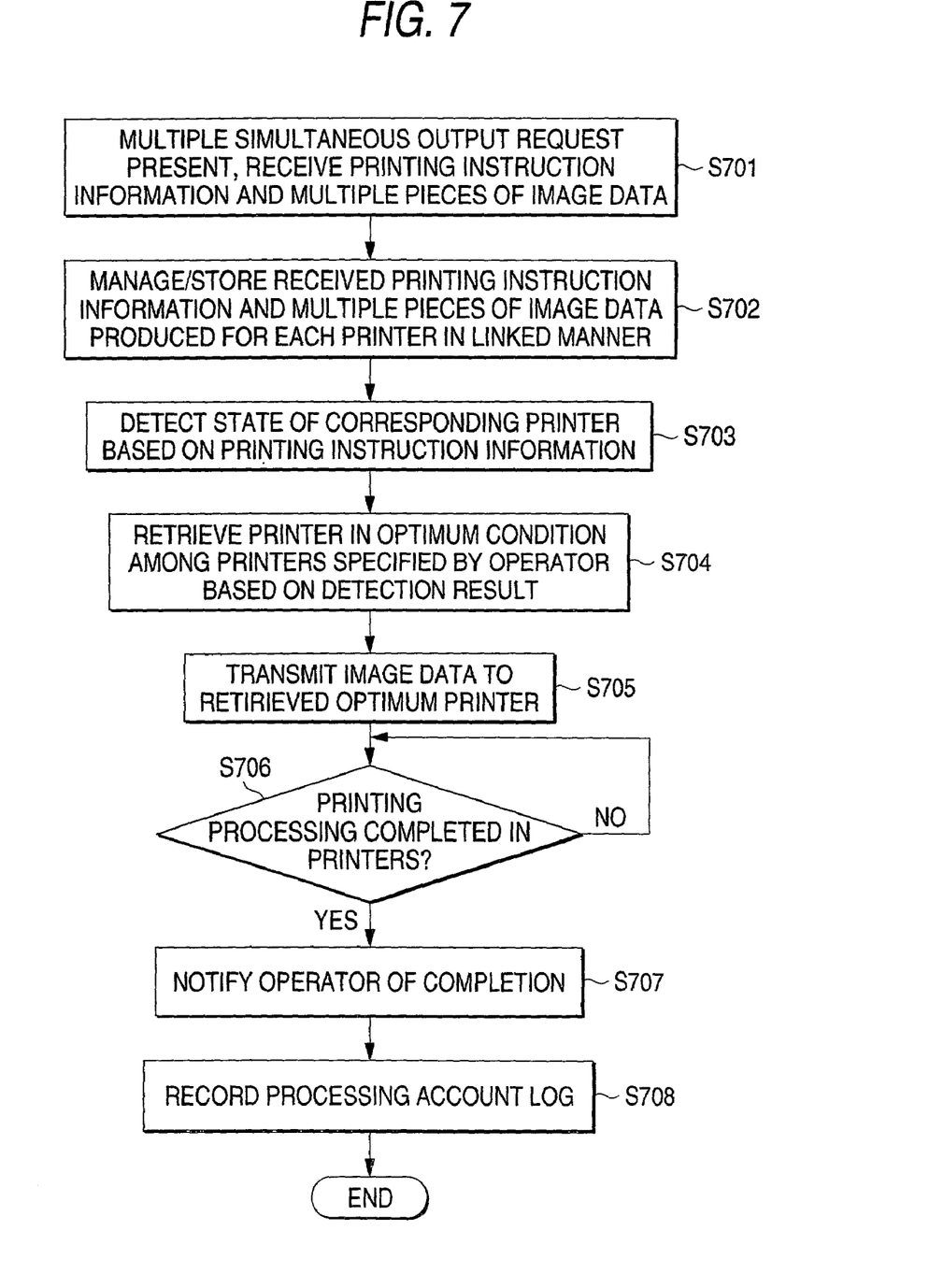

FIG. 7 is a flowchart for use in illustration of the process of processing operation on the side of printing management server 1 when the operator uses multiple, different models of printers for printing. In this example, only one printer in an optimum condition is used for printing among all models of printers selected and specified by the operator.

As shown in FIG. 7, the processing is started when the printing management server 1 receives a request of multiple simultaneous output from the scanner 2 as well as printing instruction information and multiple pieces of data produced for each model of printer (step S701).

The printing management server 1 stores the transmitted printing instruction information and the multiple pieces of image data produced for each printer linked with each other (S702).

Thereafter, the printing management server 1 detects the present state of the printer of interest based on the printing instruction information specified by the operator. More specifically, the state such as being unusable because of failure in the printer or other printing taking much time is detected (step S703).

Then, based on the result of the detection, a printer in an optimum condition among the printers specified by the operator is retrieved (step S704).

The printing management server 1 transmits image data to the retrieved optimum printer (step S705).

Then, the printing management server 1 determines whether or not the printing processing using the printer has been completed (step S706), and as a result, if it is determined that the printing processing using the printer has been completed (YES in step S706), the operator is notified of the completion (step S707).

Then, the printing management server 1 records the processing account log (information about how many sheets have been printed using the printer) (step S708), and the processing ends.

In the embodiment, the image data read and produced by the scanner 2, and the printing instruction information specified by the operator are transmitted to the printing management server 1, while the information on the storing location information of the image data may be transmitted rather than the image data itself.

In this case, the image data produced corresponding to the characteristics of each printer read by the scanner 2 is stored in the scan server 21 attached to the scanner 2, and the scanner 2 transmits the information on the storing location information of the image data and the printing instruction information specified by the operator to the printing management server 1.

The printing management server 1 stores and manages the transmitted printing instruction information and the storing location informations of the multiple pieces of image data linked with each other (see FIG. 3B).

In the printing processing, the printing management server 1 refers to the information on the storing location of the image data to be transmitted to an output destination printer based on the specified printing instruction information, reads out stored image data based on the storing locational information, and controls the image data to be transmitted to the output destination printer.

Alternatively, the printing management server 1 may transmit information on storing location of the image data to the output destination printer. On receiving the information on storing location, the output destination printer may read the image data based on the information and perform printing.

In this structure, the timing of scheduling can be set delayed as much as possible, in other words to which printer the output is destined can be scheduled immediately before output depending upon the state of the printer. Therefore, the processing can be dispatched to a printer most desired by the user.

For example, according to the conventional technique, if images are read simply initially according to the special monochrome machine, and the machine cannot be used later or out of order, the images cannot be transmitted in another occasion. An image corresponding to a machine to which printing is re-dispatched must be read again from the paper original, which is not necessary according to the present invention.

Note that according to the embodiment, image data produced using a scanner is stored and managed in a scan server, while the invention is not limited to this, and the data can directly be stored and managed using a scanner. More specifically, a server may be any server provided close to the scanner other than the printing management server.

As in the foregoing, by the printing system according to the present invention, the printing management device stores printing related information and image data in association with each other. Thus, image data corresponding to a desired printer is transmitted based on the printing related information, so that efficient and optimum printing is enabled using multiple, different models of printers.

The entire disclosure of Japanese Patent Application No. 2000-168154 filed on Jun. 5, 2000 including specification, claims, drawings and abstract is incorporated herein by reference in its entirety.

What is claimed is:

1. A printing system comprising a scanner, multiple printers, a scan server, and a printing management device receiving printing instruction information and transmitting printing information corresponding to the printing instruction information to a corresponding printer among the multiple printers, the scanner comprising:

printing instruction information setting means for setting printing instruction information including specification of a desired printer among the multiple printers;

image data producing means for producing image data corresponding to the printing instruction information set by the printing instruction information setting means; and transmitting means for transmitting the printing instruction information set by the printing instruction information setting means and information on a storing location of the image data produced by the image data producing means to the printing management device, the scan server storing and managing the produced image data and being separated from the scanner, and the printing management device comprising:

storage management means for storing and managing the printing instruction information and the information on the storing location of the image data produced by the image data producing means;

reading out means for reading out the image data from the scan server based on the information on the storing location of the image data; and transmission control means for transmitting the image data corresponding to the desired printer based on the printing instruction information stored and managed in the storage management means to the desired printer.

2. The printing system according to claim 1, wherein the printing instruction information setting means sets printing instruction information including specification of multiple desired printers, the image data producing means produces multiple pieces of image data corresponding to the respective multiple desired printers included in the printing instruction information set by the printing instruction information setting means, the transmitting means transmits the multiple pieces of image data together with the printing instruction information to the printing management device, and the storage management means stores and manages the multiple pieces of image data corresponding to the respective multiple desired printers.

3. A printing system, comprising a scanner device, multiple printers, a storage management means, and a printing management device receiving printing instruction information and transmitting printing information corresponding to the printing instruction information to a corresponding printer among the multiple printers, the scanner device comprising:

printing instruction information setting means for setting printing instruction information including specification of a desired printer among the multiple printers;

image data producing means for producing image data corresponding to the printing instruction information set by the printing instruction information setting means; and transmitting means for transmitting the printing instruction information set by the printing instruction information setting means and information on a storing location of the image data produced by the image data producing means to the printing management device, the storage management means for storing and managing the image data produced by the image data producing means and being separate from the scanner device, and the printing management device comprising:

storage means for storing and managing the printing instruction information and the information on the storing location of the image data transmitted from the transmission means in association with each other;

reading out means for reading out the image data from the storage management means based on the information on the storing location of the image data; and transmission control means for transmitting the image data corresponding to the desired printer based on the printing instruction information stored and managed by the storage means to the desired printer.

4. The printing system according to claim 3, wherein the printing instruction information setting means sets printing instruction information including specification of multiple desired printers, the image data producing means produces multiple pieces of image data corresponding to the respective multiple desired printers included in printing instruction information set by the printing instruction information setting means, the transmitting means transmits information on storing locations of the respective multiple pieces of image data together with the printing instruction information to the printing management device, and the storage management means stores and manages the information on the storing locations of the multiple pieces of image data corresponding to the respective multiple desired printers.

5. The printing system according to claim 2, wherein the multiple printers have functions different from each other, and the image data producing means produces multiple pieces of image data corresponding to the respective functions of the multiple printers.

6. The printing system according to claim 1, wherein the printing instruction information setting means comprises:

outputting method specifying means for specifying an outputting method in a printer;

printer list display means for displaying a list of selectable printers based on the outputting method specified by the outputting method specifying means;

printer specifying means for specifying a desired printer in the list of displayed printers; and setting means for setting an output mode by the printer specified by the printer specifying means.

7. A printing control method for a printing system including a scanner, a scan server separate from the scanner, multiple printers, and a printing management device receiving printing instruction information and transmitting printing information corresponding to the printing instruction information to a corresponding printer among the multiple printers, the method comprising the steps of:

causing the scanner to set printing instruction information including specification of a desired printer among the multiple printers, produce image data corresponding to the set printing instruction information, and transmit the set printing instruction information and information on a storing location of the image data to the printing management device, storing and managing the produced image data in the scan server, and causing the printing management device to store and manage the printing instruction information and the information on the storing location of the image data transmitted from the scanner, read out the image data from the scan server based on the information on the storing location of the image data, and transmit the image data corresponding to the desired printer based on the stored and managed printing instruction information.

8. The printing control method according to claim 7, wherein the image input device is caused to set printing instruction information including specification of multiple desired printers, produce multiple pieces of image data corresponding to the respective multiple desired printers included in the printing instruction information, and transmit the multiple pieces of image data together with the printing instruction information to the printing management device, and the printing management device is caused to store and manage the multiple pieces of image data corresponding to the respective multiple desired printers.

9. A printing control method for a printing system including a scanner device, multiple printers, a storage management means separate from the scanner, and a printing management device receiving printing instruction information and transmitting printing information corresponding to the printing instruction information to a corresponding printer among the multiple printers, the method comprising the steps of:

causing the scanner device to set printing instruction information including specification of a desired printer among the multiple printers, produce image data corresponding to the set printing instruction information, and transmit to the printing management device the set printing instruction information and information on a storing location of the produced image data;

storing and managing the produced image data in the storage management means; and causing the printing management device to store and manage the printing instruction information and information on the storing location of the produced image data transmitted from the scanner device in association with each other, read out the image data from the storage management means based on the information on the storing location of the image data, and transmit the produced image data corresponding to the desired printer based on the stored and managed printing instruction information to the desired printer.

10. The printing control method according to claim 9, wherein the image input device is caused to set printing instruction information including specification of multiple desired printers, produce multiple pieces of image data corresponding to the respective multiple desired printers included in the printing instruction information, and transmit information on storing locations of the respective multiple pieces of image data together with the printing instruction information to the printing management device, and the printing management device is caused to store and manage the information on the storing locations of the multiple pieces of image data corresponding to the respective multiple desired printers.

11. The printing control method according to claim 8, wherein the multiple printers have functions different from each other, and the image input device produces multiple pieces of image data corresponding to the respective functions of the multiple printers.

12. The printing control method according to claim 7, wherein the printing instruction information specifies an outputting method in a printer, displays a list of selectable printers based on the specified outputting method, specifies a desired printer in the displayed list of the printers, and sets an outputting mode by the specified printer.

* * * * *